United States Patent [19]

Koizumi et al.

[11] Patent Number: 5,082,889
[45] Date of Patent: Jan. 21, 1992

[54] REINFORCED POLYPROPYLENE COMPOSITION

[75] Inventors: Junji Koizumi, Nagoya; Yoshito Yazaki, Inazawa, both of Japan

[73] Assignee: Toyoda Gosei Co., Ltd., Nishikasugai, Japan

[21] Appl. No.: 497,030

[22] Filed: Mar. 22, 1990

[30] Foreign Application Priority Data

Apr. 19, 1989 [JP] Japan .................................. 1-99231

[51] Int. Cl.$^5$ .............................................. C08K 3/34
[52] U.S. Cl. .................................. 524/451; 524/499; 524/502; 524/511
[58] Field of Search ............. 524/451, 499, 502, 511 S

[56] References Cited

U.S. PATENT DOCUMENTS 4,603,153 7/1986 Sobajima et al. .
4,707,528 11/1987 Koizumi et al. .
4,731,401 3/1988 Moteki et al. .

FOREIGN PATENT DOCUMENTS 52-43443 4/1977 Japan .

Primary Examiner—Paul R. Michl
Assistant Examiner—Edward J. Cain
Attorney, Agent, or Firm—Cushman, Darby & Cushman

[57] ABSTRACT

A reinforced polypropylene composition comprising from 50 to 80% by weight a resin component comprising from 35 to 90 parts by weight a crystalline polypropylene (A) from 5 to 60 parts by weight a polyethylene resin (B), and from 5 to 30 parts by weight an aromatic hydrocarbon resin (C), the sum of (A), (B), and (C) being 100 parts by weight; from 15 to 45% by weight talc (D); and from 1 to 40% by weight glass fiber (E); the sum of the talc and the glass fiber being not more than 50% by weight, wherein the percentages are based on the sum of (A)+(B)+(C)+(D)+(E).

9 Claims, No Drawings

REINFORCED POLYPROPYLENE COMPOSITION

BACKGROUND OF THE INVENTION

1. Field of the Invention

The present invention relates to a reinforced polypropylene composition possessing excellent vibration damping qualities over a wide temperature range, excellent mechanical strength, and excellent heat resistance.

2. Description of the Related Art

Numerous attempts have recently been made to substitute plastic products for various metal automotive components in order to reduce weight and realize an improvement in fuel economy. Among plastic materials, polypropylene is a material which is well balanced in various physical properties and relatively inexpensive, so that it is often applied to many trim parts for automobiles. A reinforced polypropylene obtained by blending polypropylene with a filler such as talc, glass fiber, calcium carbonate, or a blend thereof, is both strong and heat resistant. It is thus often utilized in automotive engine compartment components such as timing belt covers, gear covers, fan shrouds, or air cleaner covers, so as to impart heat resistance in a high temperature atmosphere.

In addition to vehicle weight reduction, however, automotive noise reduction has been sought. In particular, a reduction in noise originating in the engine compartment has been desirable.

As a measure to counter noise, vibration damping, sound insulation, vibration proofing, and sound absorption have been proposed. The measure should be selected in view of the fact that either sound propagated in a solid or sound transmitted in air may contribute to the engine noise. In automotive parts such as a timing belt cover or a gear cover, the noise is caused primarily by sound propagated in a solid. Thus, an improvement of the vibration damping property in plastic automotive materials is desirable for the purpose of noise reduction.

Japanese Patent Application Laid Open No. 43443/1987 discloses a conventional reinforced polypropylene with improved vibration damping properties. This reinforced polypropylene is produced by blending polypropylene with a tackiness-providing product such as a cumarone-indene resin or thermoplastic elastomer.

In the above-mentioned reinforced polypropylene, however, the mechanical strength, heat resistance, and vibration damping property are not sufficient in the case where the conventional reinforced polypropylene is utilized in automotive parts employed in a relatively high temperature environment ranging from 40° to 100° C.

In general, the molecular structure of plastic (resin) materials is irregular and the linkage between chains is weak in comparison to metallic materials. Plastics are thus highly viscoelastic and exhibit vibration damping properties. The vibration damping property of such materials is highly temperature dependent, however, so that damping is greatest near temperature at which the loss factor of dynamic dispersion due to the glass transition of the resin material is a maximum. In general, the damping property is greatly lowered at a temperature in the range of practical uses. The maximum value of the loss factor due to the glass transition appears in general at a temperature ranging from −30° to 25° C., and the minimum value appears at about 50° C.

This property appears similarly in a reinforced polypropylene containing a filler. The value of the loss factor is even greater because of the addition of the filler. Thus, the lowering of the value of the loss factor is a reason why a satisfactory vibration damping property cannot be expected in a reinforced polypropylene used primarily at a temperature ranging from 40° to 100° C.

SUMMARY OF THE INVENTION

An object of the present invention is to provide a reinforced polypropylene composition possessing excellent vibration damping properties within a wide temperature range combined with sufficient mechanical strength and heat resistance.

The present invention comprises a reinforced polypropylene composition comprising polypropylene, polyethylene, an aromatic hydrocarbon, talc, and glass fiber.

In a specific embodiment, there is provided a reinforced polypropylene composition comprising a resin component comprising (A), (B), (C), talc (D), and glass fiber (E). This reinforced polypropylene composition comprises from 50 to 80% by weight of a resin component which comprises from 35 to 90 parts by weight of a crystalline polypropylene (A) from 5 to 60 parts by weight of a polyethylene resin (B) and from 5 to 30 parts by weight of an aromatic hydrocarbon resin (C).

The sum of the crystalline polypropylene (A), the polyethylene resin (B), and the aromatic hydrocarbon resin (C) is 100 parts by weight; from 15 to 45% by weight is talc (D); and from 1 to 40% by weight is glass fiber. The sum of the talc and the glass fiber is not more than 50% by weight. The percentages are based on the sum of (A)+(B)+(C) +(D)+(E).

DETAILED DESCRIPTION OF THE INVENTION

In the crystalline polypropylene, a polypropylene, a modified polypropylene or a blend of both may be used. As the polypropylene, a homopolypropylene, a propylene-ethylene random copolymer (comprising not more than 20% by weight ethylene), a propylene—ethylene block copolymer (comprising not more than 20% by weight ethylene), or a blend composed of at least two of the aforesaid can be used. The modified polypropylene is produced by denaturalizing a polypropylene and an unsaturated carboxylic acid or the derivative thereof in the presence of an organic peroxide.

It is preferable that a blend of the polypropylene and the modified polypropylene be used as the crystalline polypropylene. The crystalline polypropylene preferably contains the modified polypropylene in the amount of 1-20% by weight. The melt flow index of the crystalline polypropylene is preferably within the range of 5-50. When the melt flow index is less than 5, molding machinability and the external appearance of the molded product deteriorate, yet when it exceeds 50, impact resistance is lowered.

The crystalline polypropylene comprises 35-90 parts by weight of the resin component (A+B+C). (The total amount of the resin component (A +B+C) is 100 parts by weight.) The crystalline polypropylene is thus present in the amount of 17.5-72% by weight based on the reinforced polypropylene composition. This blending amount is determined according to the optimum combination of polyethylene resin with the aromatic hydrocarbon resin, talc, and glass fiber.

The polyethylene resin comprises 5-60 parts by weight of the resin component (A+B+C). Thus, the polyethylene resin comprises 2.5-48% by weight based on the reinforced polypropylene composition. It is possible to use a combination of polyethylene resins such as high density polyethylene, low density polyethylene, and linear low density polyethylene.

The aromatic hydrocarbon resin is a petroleum resin represented by the following chemical structure (wherein R and R1 designate H or $CH_3$ and n designates the degree of polymerization):

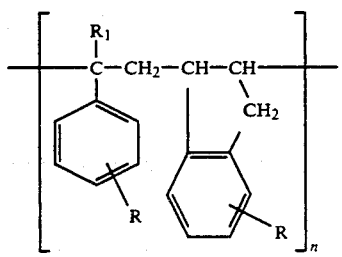

The aromatic hydrocarbon resin comprises 5-30 parts by weight of the resin component. Thus, the aromatic hydrocarbon resin comprises 2.5-24% by weight based on the reinforced polypropylene composition. An aromatic hydrocarbon resin having a softening temperature ranging from 80° to 170° C. (measured by ball and ring method) is typically employed.

The sum of the crystalline polypropylene, the polyethylene resin, and the aromatic hydrocarbon resin is 100 parts by weight. If the crystalline polypropylene composition is less than 35 parts by weight, the mechanical strength and heat resistance diminish; if it exceeds 90 parts by weight, the vibration damping property is lowered. If the polyethylene resin is less than 5 parts by weight, the vibration damping property is lowered; if it exceeds 60 parts by weight, the mechanical strength is lowered. If the aromatic hydrocarbon resin is less than 5 parts by weight, a satisfactory vibration property cannot be obtained; if it exceeds 30 parts by weight, strength and heat resistance are lowered. It is preferable that the composition contain from 60 to 85 parts by weight crystalline polypropylene, 5 to 30 parts by weight polyethylene resin, and the balance as aromatic hydrocarbon resin.

According to the present invention, a certain amount of talc and glass fiber is blended in the resin component so as to retain the vibration damping property while improving the mechanical strength and heat resistance.

The talc is a plate-shaped filler represented by the chemical formula, $3MgO.4SiO.H_2O$. It is preferable that the talc have an average particle diameter of 1-20 μm for mechanical strength, heat resistance, and workability. If the average particle diameter exceeds 20 μm, the dispersion of the talc becomes insufficient for reinforcement. Conversely, if it is less than 1 μm, the talc becomes bulky, so that the mixture with the crystalline polypropylene is inhibited. It is preferable to use talc having an average particle diameter of 1-15 μm. In the case where high mechanical strength and high rigidity are specially required, it is preferable to use talc having an average particle diameter of 1.5-5 μm. The average particle diameter mentioned here is a value defined by a particle diameter (D 50) on 50% cross line under an integrating sieve in a particle size distribution curve measured by a centrifugal sedimentation method.

The glass fiber is used as a reinforcing agent for polypropylene. Either long-staple type (glass roving) or a short-staple type (chopped strand, milled fiber) having an optional shape are applicable to the present invention. The chopped strand is the most desirable. Furthermore, a glass fiber which has been treated with a silane coupling agent on the surface with a length of 3-6 mm and a diameter of 5-15 μm is preferable. Where a chopped strand treated with a silane coupling agent is used, the mechanical strength and heat resistance of the reinforced polypropylene composition can be improved by using from 1 to 20% by weight (based on the reinforced polypropylene composition) of a modified polypropylene as the aforesaid crystalline polypropylene.

In this reinforced polypropylene composition, 15 to 45% by weight of the talc and 1 to 40% by weight of the glass fiber are utilized. The sum of the talc and the glass fiber is not more than 50% by weight. Where the amount of the talc is less than 15% by weight or the amount of the glass fiber is less than 1%, a satisfactory mechanical strength and heat resistance cannot be expected. Where only the talc is blended, the hardness can be improved, but the mechanical strength and the heat resistance cannot attain the level practicable in common use at a temperature of 100° C. Where the talc is more than 45% by weight or the glass fiber is more than 40%, or the total amount of the talc and the glass fiber is more than 50% by weight, the mechanical strength and the heat resistance are satisfactory, but the vibration damping property is lowered and the external appearance of the product deteriorates.

A granular glass-reinforced polypropylene may be produced by blending the glass fiber with the crystalline polypropylene and granulating it. In this case, the components exclusive of the glass fiber are blended, and then the glass-reinforced polypropylene is added to the blended components during product molding. It is further possible that a pellet composed of the other components exclusive of the glass fiber may be previously prepared and then mixed with the glass-reinforced polypropylene.

In the present invention, it is also possible to add an ethylene-α-olefin copolymer to the polypropylene composition so as to improve impact resistance.

To blend the reinforced polypropylene composition, a conventional resin blending apparatus, such as a monoaxial extruder, two-axial extruder, kneader, Bravender mixer, or Banbury mixer may be employed. Usually, all the components are blended in the required ratio by a tumbling blender, a Henschel mixer, or a ribbon mixer, then kneaded by an extruder to produce a composition in the form of a pellet. The composition is then processed to form various molded automotive products.

In kneading, a two-stage method may be used in which the polyethylene resin and the aromatic hydrocarbon resin are first melted, mixed, and kneaded by an extruder. The resulting mixed composition is then mix-extruded together with the crystalline polypropylene, the talc and the glass fiber. Further, the talc and the glass fiber may be supplied partially or in whole in the intermediate of the cylinder. In addition to the aforesaid components, an addition agent, such as an antioxidant, a ultraviolet ray absorbing agent, a lubricant, an antistatic agent, a core agent, a pigment, a flame retarder, an extending agent, or a processing agent, may be added.

In the present invention, a reinforced polypropylene composition having the aforesaid blending composition is provided. Thus, the reinforced polypropylene composition according to the present invention has a high vibration damping property (i.e., loss factor of not less than 0.25) at a relatively high temperature (i.e., 40°-100° C.), thus achieving the composition sought by the prior art. Further, it has excellent properties at the aforesaid high temperature, such as a flexural elastic modulus of not less than 35,000 kg/cm$^2$, a flexural strength of not less than 700 kg/cm$^2$, and a thermal deformation temperature of not less than 120° C.

The reinforced polypropylene composition of the present invention can be used to form automotive parts for use in the engine compartment or as trim parts. In particular, it is suitable for parts such as a timing belt cover, a gear cover, or an air cleaner cover in the engine compartment, where engine vibration noise is generated.

As described above, the present invention provides a reinforced polypropylene composition having excellent vibration damping properties, mechanical strength, and heat resistance.

The method of measurement of each of the properties is explained below. The blending ratio of the components and the test results for each composition in each of the examples is shown in Tables 1-3.

The blending composition ratio is represented by weight per cent based on the reinforced polypropylene composition. The weight per cent range of each component in the reinforced polypropylene composition of the present invention is 17.5-72% as a crystalline polypropylene, 2.5-48% as a polyethylene resin, 2.5-24% as an aromatic hydrocarbon resin, 15-45% as talc, and 1-40% as glass fiber.

Flexural elastic modulus and flexural strength were measured according to ASTM D790.

Thermal deformation temperature was measured under the load of 18.6 kg/cm$^2$ according to ASTM D648.

Loss factor was calculated as follows. A flat regular board 150 mm square and 3 mm thick, and made of the reinforced polypropylene composition, was prepared by injection molding. The center of the board was vibrated in 0.1 G within a thermostat box wherein the temperature can be controlled from room temperature to 100° C., and the transfer function was measured. The loss factor was then calculated from the first sympathetic point by means of half amplitude.

Test pieces in the examples and the comparative examples were prepared by the following process. The composition mixed in the predetermined blending ratio was melted and kneaded in a bi-axial extruder (length of 27 mm and a diameter of 30 mm) which rotates in different directions, so as to produce a pellet. After the pellet was dried for 3 hours at 80° C., it was molded in a 5 ounce injection molding machine to produce a test piece.

EXAMPLES 1 to 11 and COMPARATIVE EXAMPLES 1 to 6

Each example and comparative example is explained in conjunction with Tables 1 to 3.

In each of the examples and comparative examples exclusive of Comparative Example 6, a mixture of HIGHPAUL J-800 (homopolymer having a melt flow index of 22) and FRPP-E-7000 (homopolypropylene composition containing 30% of glass fiber), both of which are produced by Mitsui Petrochemical Industries, Ltd. was used as the crystalline polypropylene. In Comparative Example 6, a mixture of the aforesaid HIGHPAUL J-800 and PPG60-4 (POLYPLASTIC CO. LTD. homopolypropylene containing 60% of glass fiber) was used.

Polyethylene A is HI-Zex 1300J high density polyethylene; Polyethylene B is NEOZEX 3510F medium density polyethylene; Polyethylene C is MILASON67 low density polyethylene; Polyethyene D is Ultzex 25100J linear low density polyethylene; and Polyethylene E is HIGHZEX 5200S high density polyethylene, all of which are produced by Mitsui Petrochemical Industries, Ltd.

As the aromatic petroleum resin, NISSEKI NEOPOLYMER 120 (having a softening point of 120° ) of Nippon Petrochemicals Co. Ltd. was used. As the talc, LMR100 (having an average particle size of 1.8 μm) of Fuji Talc was used. The glass fiber was blended in the crystalline polypropylene.

Example 10 shows one example in which two kinds of polyethylene resin were used together. In Example 11, an ethylene-α-olefin copolymer (TAFMER A4085 of Mitsui Petrochemical Industries, Ltd.) was added so as to improve the impact resistance of the reinforced polypropylene composition.

Examples 1 to 3 will be compared with Comparative Examples 1 and 2. As shown in Table 1, Examples 1 to 3 and Comparative Examples 1 and 2 contain the same amount of talc and glass fiber, but Comparative Example 1 contains no polyethylene resin nor aromatic hydrocarbon resin. Thus, the loss factor in Comparative Example 1 is low; it is approximately 0.02. In Comparative Example 2, the thermal deformation temperature is low (112° C.) because it contains no polyethylene resin; the loss factor is high, because it contains the aromatic hydrocarbon resin. In Comparative Example 3, the flexural strength and the thermal deformation temperature are extremely low.

In comparison with these Comparative Examples, Examples 1 to 3 in the present invention attain the loss factor of not less than 0.025, the thermal deformation of not less than 120° C., the flexural strength of not less than 700 kg/cm$^2$, and the flexural elastic modulus of not less than 35,000.

In Table 2, the loss factor in Comparative Example 6 is less than 0.03 in a low temperature range because this example contains no talc. Though Examples 4 to 7 and Comparative Examples 4 and 5 contain the same amount of talc and glass fiber, Comparative Example 4 contains but a small amount of the aromatic hydrocarbon, while Comparative Example 5 contains no aromatic hydrocarbon resin. Thus, the loss factors of these comparative examples in a low temperature range are less than 0.025.

In Examples 4 to 7, the kind and amount of polyethylene resin are varied, or the amount of crystalline polypropylene is varied. Each of these examples satisfies the object of the present invention.

In Examples 8 to 10 shown in Table 3, the amount of each component is varied. Each of these examples demonstrates an excellent loss factor and thermal deformation temperature.

In Example 11, an ethylene-α-olefin copolymer is added. This example also exhibits the excellent properties of Example 1. In Example 11, the impact resistance measured by the Izod test (with notch) was 6.2 kg.cm/cm. Example 10 (which contains Polyethylene A in place of the ethylene-α-olefin copolymer in Example 11) possesses an impact resistance of 4.4 kg.cm/cm.

What is claimed is:
1. A reinforced polypropylene composition comprising:

TABLE 1

| | Sample | | | | | |
|---|---|---|---|---|---|---|
| | Example | | | Comparative Example | | |
| | 1 | 2 | 3 | 1 | 2 | 3 |
| Blend (%) | | | | | | |
| Crystalline polypropylene | 49 | 49 | 49 | 70 | 49 | 49 |
| Polyethylene resin A | 12.6 | | | | | 12.6 |
| Polyethylene resin B | | 12.6 | | | | |
| Polyethylene resin C | | | 12.6 | | | |
| Polyethylene resin D | | | | | | |
| Polyethylene resin E | | | | | | |
| Aromatic petroleum resin | 8.4 | 8.4 | 8.4 | | 21 | 8.4 |
| Talc | 15 | 15 | 15 | 15 | 15 | 30 |
| Glass Fiber | 15 | 15 | 15 | 15 | 15 | |
| Flexural elastic modulus (Kg/cm$^2$) | 43000 | 41000 | 41000 | 48000 | 49000 | 42000 |
| Flexural strength (Kg/cm$^2$) | 830 | 820 | 800 | 980 | 800 | 500 |
| Thermal deformation temp. (°C.) | 133 | 132 | 135 | 148 | 112 | 78 |
| Loss factor | | | | | | |
| 40° C. | 0.033 | 0.036 | 0.038 | 0.020 | 0.040 | 0.039 |
| 60° C. | 0.040 | 0.041 | 0.044 | 0.020 | 0.050 | 0.055 |
| 80° C. | 0.050 | 0.054 | 0.055 | 0.022 | 0.146 | 0.092 |
| 100° C. | 0.072 | 0.077 | 0.080 | 0.032 | 0.159 | 0.157 |

TABLE 2

| | Sample | | | | | | |
|---|---|---|---|---|---|---|---|
| | Example | | | | Comparative Example | | |
| | 4 | 5 | 6 | 7 | 4 | 5 | 6 |
| Blend (%) | | | | | | | |
| Crystalline polypropylene | 49 | 56 | 49 | 35 | 63 | 49 | 49 |
| Polyethylene resin A | | | | | | | 12.6 |
| Polyethylene resin B | | | | | | | |
| Polyethylene resin C | 12.6 | | | | | | |
| Polyethylene resin D | | 8.4 | 12.6 | 21.0 | 4.2 | 21.0 | |
| Polyethylene resin E | 8.4 | 5.6 | 8.4 | 14.0 | 2.8 | | 8.4 |
| Aromatic petroleum resin | 15 | 15 | 15 | 15 | 15 | 15 | |
| Talc | 15 | 15 | 15 | 15 | 15 | 15 | 30 |
| Glass fiber | 41000 | 48000 | 44000 | 45000 | 47000 | 44000 | 54000 |
| Flexural elastic modulus (Kg/cm$^2$) | 810 | 900 | 820 | 780 | 940 | 840 | 890 |
| Flexural strength (Kg/cm$^2$) | 131 | 136 | 133 | 124 | 145 | 132 | 135 |
| Thermal deformation temp. (°C.) | | | | | | | |
| Loss factor | | | | | | | |
| 40° C. | 0.039 | 0.026 | 0.039 | 0.045 | 0.024 | 0.020 | 0.023 |
| 60° C. | 0.045 | 0.029 | 0.045 | 0.058 | 0.024 | 0.029 | 0.026 |
| 80° C. | 0.056 | 0.036 | 0.056 | 0.089 | 0.031 | 0.042 | 0.037 |
| 100° C. | 0.082 | 0.048 | 0.082 | 0.140 | 0.040 | 0.055 | 0.051 |

TABLE 3

| | Sample Example | | | |
|---|---|---|---|---|
| | 8 | 9 | 10 | 11 |
| Blend (%) | | | | |
| Crystalline polypropylene | 66 | 56 | 49 | 49 |
| Polyethylene resin A | | | 6.3 | 6.3 |
| Polyethylene resin B | | | | |
| Polyethylene resin C | | | 6.3 | |
| Polyethylene resin D | | | | |
| Polyethylene resin E | 8.4 | 8.4 | | |
| Aromatic petroleum resin | 5.6 | 5.6 | 8.4 | 8.4 |
| Talc | 10 | 10 | 15 | 15 |
| Glass fiber | 10 | 20 | 15 | 15 |
| Ethylene-α-olefin copolymer | | | | 6.3 |
| Flexural elastic modulus (Kg/cm$^2$) | 37000 | 50000 | 46000 | 42000 |
| Flexural strength (Kg/cm$^2$) | 760 | 1060 | 900 | 840 |
| Thermal deformation temp. (°C.) | 129 | 146 | 133 | 133 |
| Loss factor | | | | |
| 40° C. | 0.030 | 0.025 | 0.035 | 0.030 |
| 60° C. | 0.034 | 0.028 | 0.042 | 0.037 |
| 80° C. | 0.043 | 0.036 | 0.057 | 0.050 |
| 100° C. | 0.057 | 0.047 | 0.084 | 0.079 | from 50 to 80% by weight a resin component comprising from 35 to 90 parts by weight a crystalline polypropylene (A) of 5 to 50, from 5 to 60 parts by weight a polyethylene resin (B), and from 5 to 30 parts by weight an aromatic hydrocarbon resin (C), which is represented by the following chemical structure wherein R and R1 designate H or CH₃, and n designates the degree of polymerization:

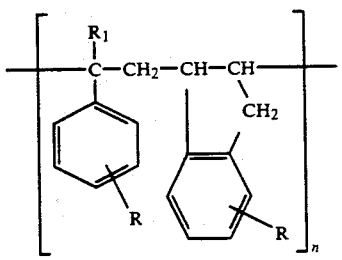

said aromatic hydrocarbon resin having a softening temperature ranging from 80° to 170° C. measured by the ball and ring method,
the sum of (A), (B), and (C) being 100 parts by weight;
from 15 to 45% by weight talc (D); and
from 1 to 40% by weight glass fiber (E);
with the sum of said talc and said glass fiber being not more than 50% by weight of the total sum of (A)+(B)+(C)+(D)+(E).

2. A reinforced polypropylene composition according to claim 1, wherein said crystalline polypropylene is a polypropylene, a modified polypropylene, or a blend of said polypropylene and said modified polypropylene.

3. A reinforced polypropylene composition according to claim 2, wherein said polypropylene is at least one selected from the group consisting of a homopolypropylene, a propylene-ethylene random copolymer, and a propylene-ethylene block copolymer.

4. A reinforced polypropylene composition according to claim 2, wherein said modified polypropylene is produced by homopolymerization of said polypropylene with an unsaturated carboxylic acid or the derivative thereof in the presence of an organic peroxide.

5. A reinforced polypropylene composition according to claim 2, wherein said crystalline polypropylene is a blend comprising from 80 to 99% by weight of said polypropylene and from 1 to 20% by weight of said modified polypropylene.

6. A reinforced polypropylene composition according to claim 1, wherein at least one of high density polyethylene, low density polyethylene, and linear low density polyethylene is used as said polyethylene resin.

7. A reinforced polypropylene composition according to claim 1, wherein said glass fiber is in the form of a glass roving or a chopped strand.

8. A reinforced polypropylene composition according to claim 1, wherein said glass fiber is from 3 to 6 mm long, and the surface thereof is treated by a silane coupling agent.

9. A reinforced polypropylene composition comprising:
from 50 to 80% by weight a resin component comprising from 35 to 90 parts by weight a crystalline polypropylene (A) of 5 to 50, from 5 to 60 parts by weight a polyethylene resin (B) which is at least one of high density polyethylene, low density polyethylene and a linear low density polyethylene, and from 5 to 30 parts by weight an aromatic hydrocarbon resin (C), the sum of (A), (B), and (C) being 100 parts by weight;
from 15 to 45% by weight talc (D); and
from 1 to 40% by weight glass fiber (E);
with the sum of said talc and said glass fiber being not more than 50% by weight of the total composition and the percentages being based on the sum of (A)+(B)+(C)+(D)+(E).

* * * * *